(No Model.) 5 Sheets—Sheet 1.

J. COULTER.
STONE DRESSING MACHINE.

No. 387,342. Patented Aug. 7, 1888.

WITNESSES:
John A. Rennie.
Wm. J. F. Hannan.

INVENTOR:
James Coulter,
By his Attorneys
Arthur G. Fraser & Co.

(No Model.) 5 Sheets—Sheet 2.
J. COULTER.
STONE DRESSING MACHINE.
No. 387,342. Patented Aug. 7, 1888.
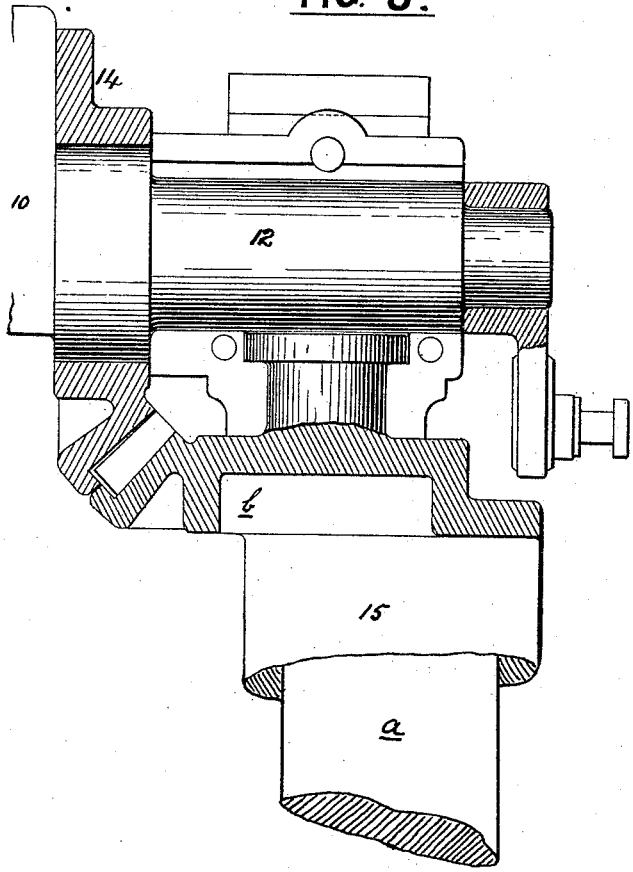
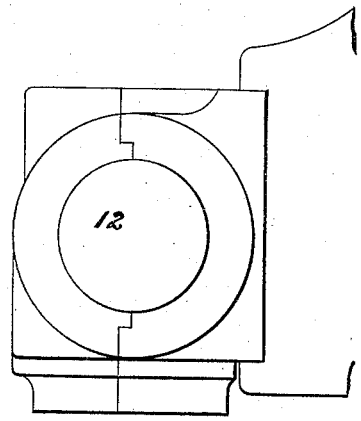
WITNESSES:
John A. Rennie.
Wm. K. Hannam.
INVENTOR:
James Coulter,
By his Attorneys,
Arthur C. Fraser &co.

(No Model.) 5 Sheets—Sheet 3.
J. COULTER.
STONE DRESSING MACHINE.
No. 387,342. Patented Aug. 7, 1888.
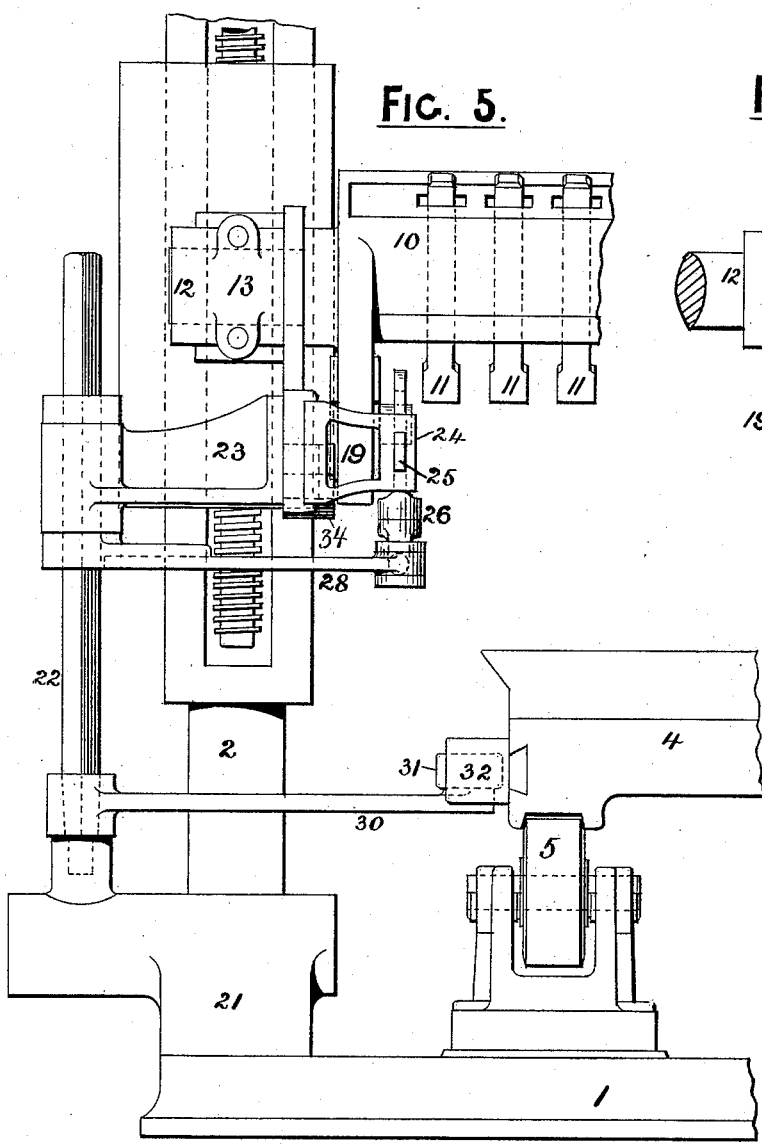
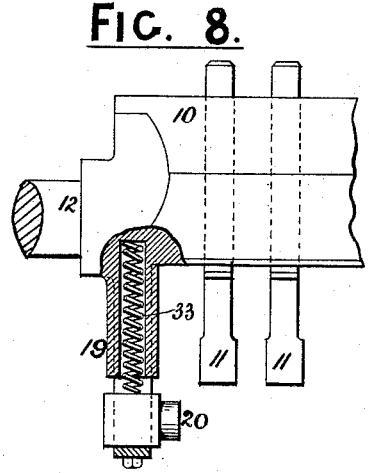
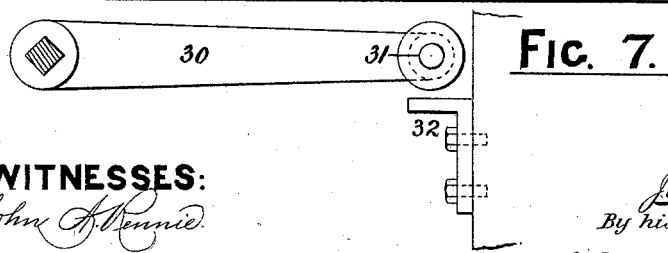
WITNESSES:
John A. Rennie
Wm. F. Hannan
INVENTOR:
James Coulter
By his Attorneys,
Arthur O. Fraser

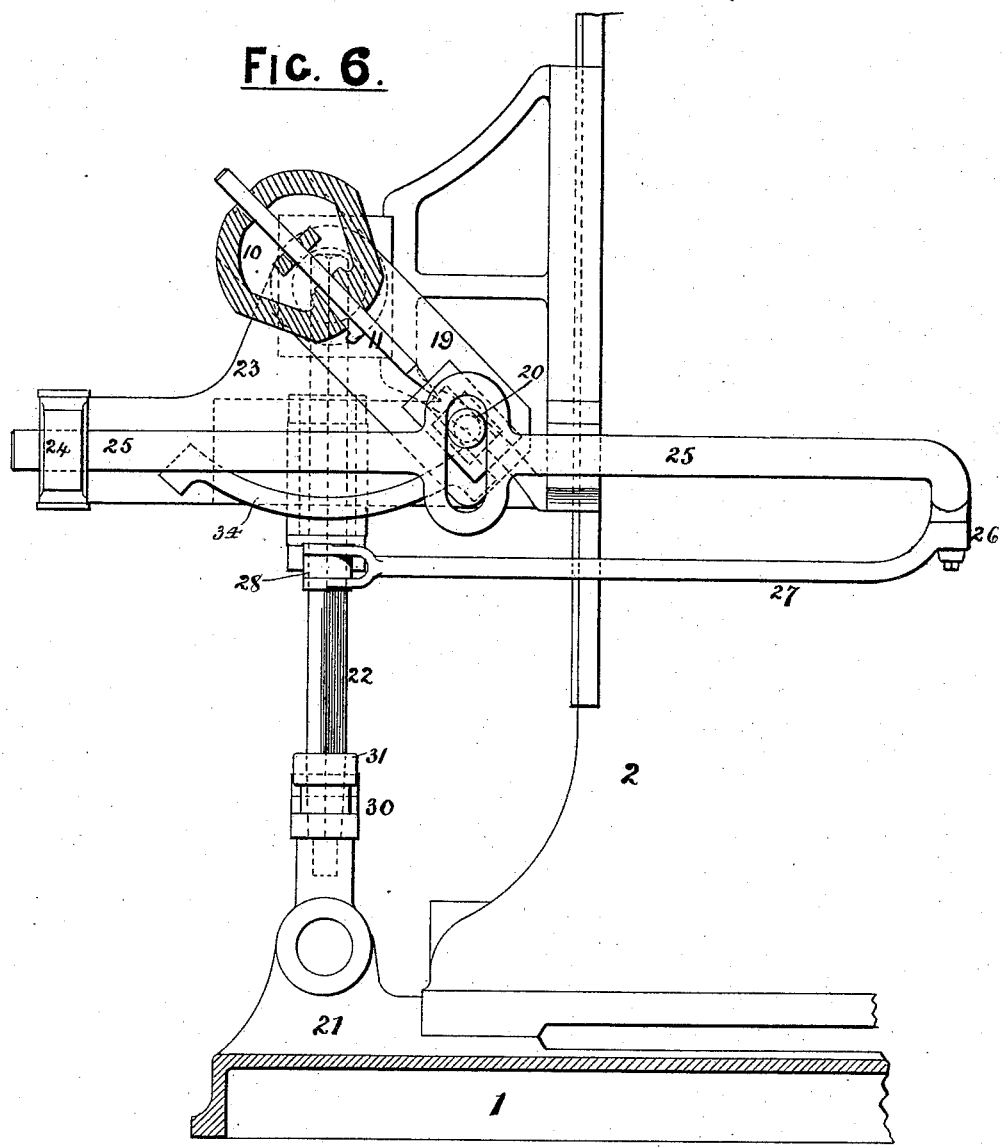

(No Model.) 5 Sheets—Sheet 5.

J. COULTER.
STONE DRESSING MACHINE.

No. 387,342. Patented Aug. 7, 1888.

WITNESSES:
John A. Rennie
Wm. H. Hannam

INVENTOR:
James Coulter,
By his Attorneys,
Arthur E. Fraser & Co.

UNITED STATES PATENT OFFICE.

JAMES COULTER, OF BATLEY, COUNTY OF YORK, ENGLAND.

STONE-DRESSING MACHINE.

SPECIFICATION forming part of Letters Patent No. 387,342, dated August 7, 1888.

Application filed October 6, 1887. Serial No. 251,609. (No model.) Patented in England November 1, 1887, No. 14,851.

*To all whom it may concern:*

Be it known that I, JAMES COULTER, a subject of the Queen of Great Britain, residing in Batley, county of York, England, have invented certain new and useful Improvements in Stone-Dressing Machinery, of which the following is a specification.

This invention is the subject of Letters Patent of Great Britain, dated November 1, 1887, No. 14,851.

My invention has reference to that class of stone-dressing machinery where the stone is placed upon a table traversing backward and forward underneath cutting-tools somewhat in the manner of an iron-planing machine, such as is shown in British Letters Patent No. 959, dated April 1, 1872, granted to myself and Herbert Harpin.

My improvements therein consist, first, in the employment of cutting-tools placed horizontally and in cutting-tools placed vertically for the purpose of dressing or cutting the upper surface and also one edge of the stone, such cutting-tools being geared together by beveled or toothed segments, so that when the horizontal cutting-tool holder is reversed the vertical cutting-tool holder is also reversed.

My invention consists, secondly, in apparatus to be employed for reversing such cutting-tools.

My improvements relate, thirdly, to the apparatus for moving the table and stone laterally underneath the cutting-tools, so that when the tools have dressed one part of the stone the said stone can be moved so that the remaining portion of the stone can be operated upon by the tools.

Such being the nature and object of my invention, I will now proceed to describe the same more fully, and for that purpose make reference to the accompanying sheets of drawings, illustrative thereof, wherein—

Figure 1:
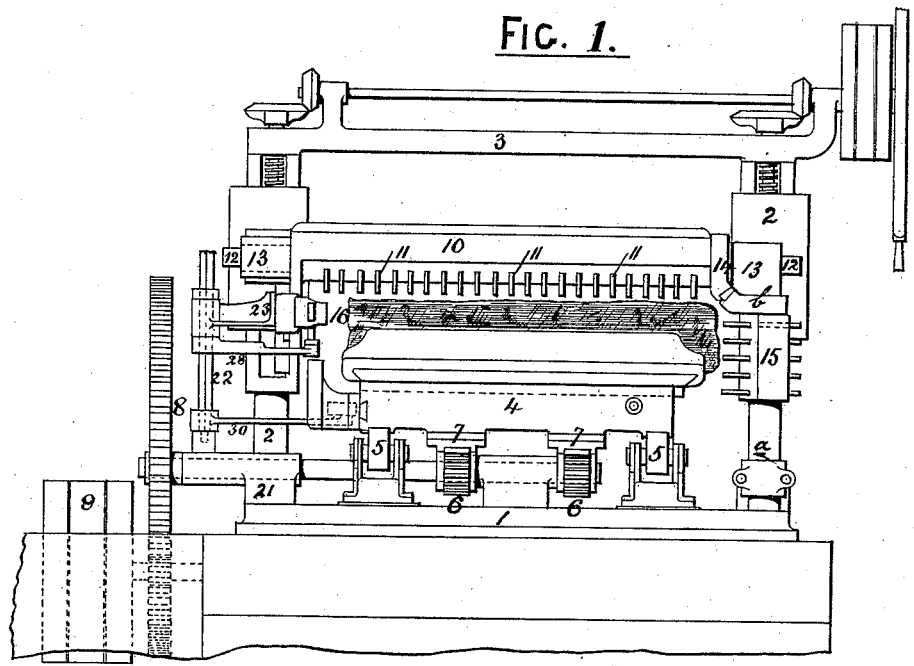
Figure 2:
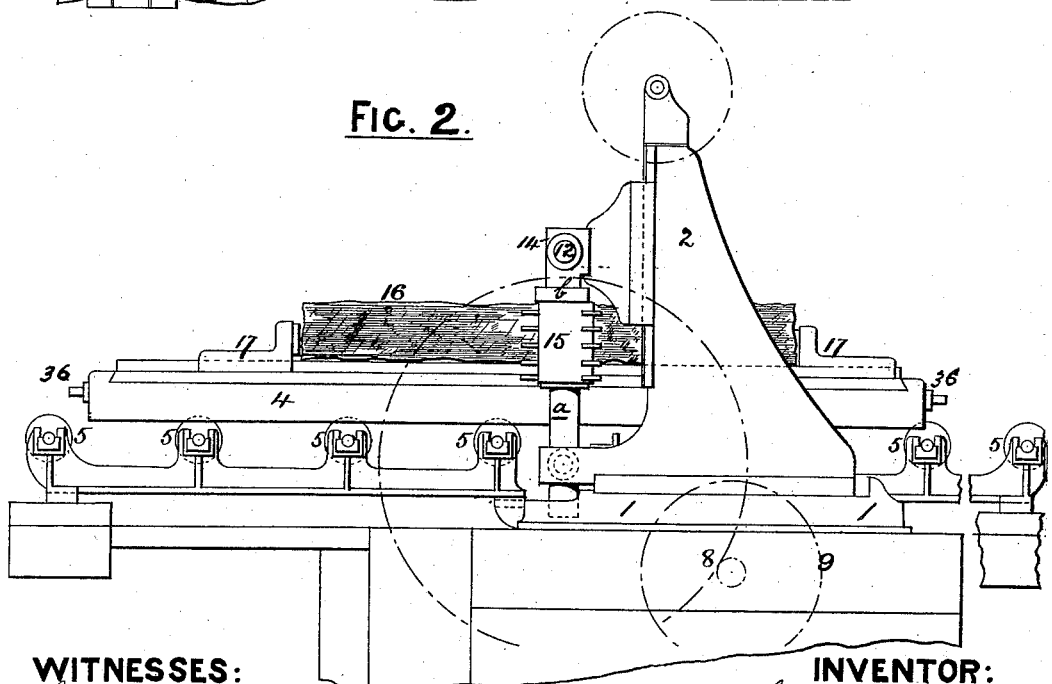
Figure 9:
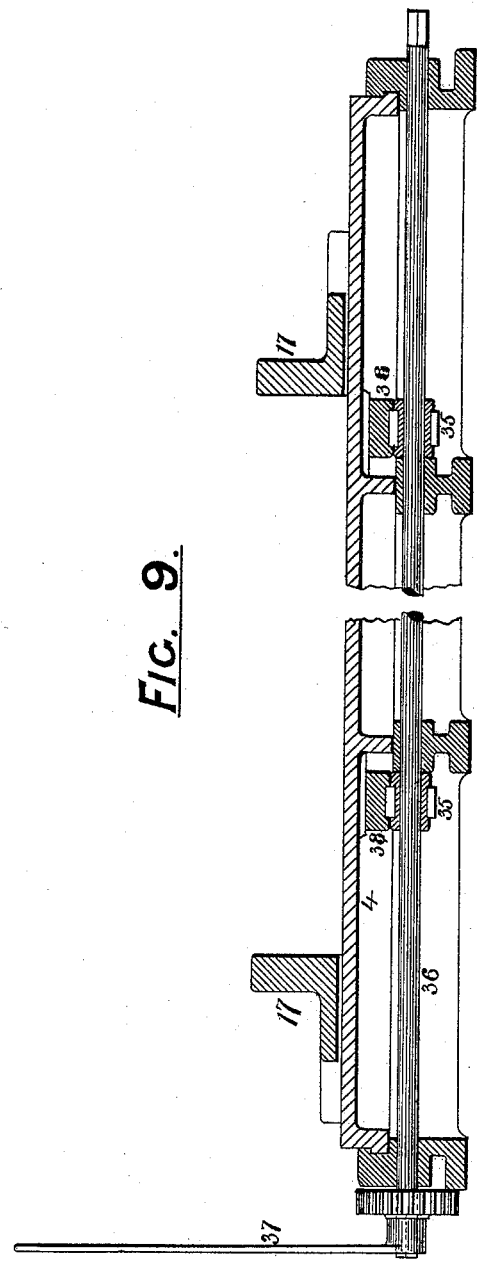
Figure 10:
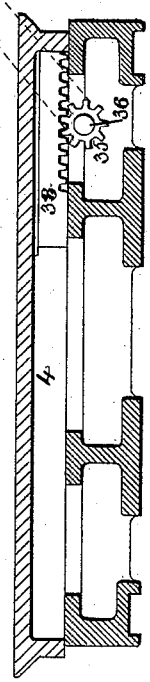

Figure 1 is an end view of a stone-dressing machine having my improvements applied thereto, and Fig. 2 is a side view thereof. Figs. 3 and 4 are detail views showing the bearings of the horizontal and vertical tool-holders and the connecting gearing of the same. Fig. 5 is an enlarged fragmentary view showing the same mechanism which is shown at the left in Fig. 1. Fig. 6 is a vertical section across the tool-holder, looking toward the mechanism shown in Fig. 5. Fig. 7 is a fragmentary plan view of the reciprocating table, showing the connection of the same with the lever-arm which reverses the tool-holders. Fig. 8 is a detail view of one end of the horizontal tool-holder; and Figs. 9 and 10 are longitudinal and cross vertical sections, respectively, of the reciprocating table.

1 represents the stationary frame-work of the machine carrying vertical standards 2, connected together by top cross-rail, 3.

4 represents the traveling table resting and running upon small rollers 5, such table being caused to travel backward and forward by pinion-wheels 6, working in racks 7, fixed underneath the said table 4, such said pinion being driven by gear-wheels 8 and pulleys 9.

10 is the horizontal oscillating cross-head or tool-holder, corresponding in length to the width of the machine, such tool-holder being made with a number of holes or slots to receive the cutting-tools 11, which are fastened therein by wedges or other suitable means. The cross-head is made at each end with journals or studs 12, which rest in and are supported by pedestals or brackets 13; but on the right-hand end of the said cross-head is fixed a quadrant bevel-wheel, 14, gearing with another quadrant bevel-wheel, $b$, attached to the vertical oscillating tool-holder 15, supported by a vertical pillar, $a$. (See Figs. 1, 2, 3, and 4.)

The stone to be operated upon is represented at 16, and is fastened upon the table 4 by adjustable sliding vises 17, which can be made to slide backward and forward to the requirement of the stone. It will be seen that as the bed and stone travel backward and forward underneath the cutting-tools the upper surface of the stone and one edge thereof will be planed or dressed.

In order to reverse the position of the cutting-tools each time the traveling table arrives at the extreme end of its backward and forward stroke, the left-hand side of the tool-holder 10 is made with a projecting piece or lever-arm, 19, provided with an opening or slot to receive a sliding block carrying an anti-friction bowl, 20. The frame-work of the machine carries a bracket, 21, which supports the lower end of the rocking square vertical shaft 22. (See Figs. 5 and 6.) To the bracket 13, I attach a suitably-shaped bracket, 23, carrying projecting pieces 24, for the purpose of receiving horizontal slotted lever 25, hinged at 26 to a horizontal rod, 27, which rod is connected by a pin to another rod, 28, (see Fig. 5,) which latter rod is fastened to the vertical rocking shaft 22. The lower end of the rocking shaft also carries a lever-arm, 30, (see plan view, Fig. 7,) at one end of which arm is an anti-friction bowl, 31, arranged to be opposite a small catch, 32, attached to each end of the traveling table, the arrangement being such that when the traveling table arrives at the end of its stroke in either direction the dog or catch 32 would strike the anti-friction bowl 31, thereby causing the vertical shaft 22 to rock, in doing which the series of rods 27 and 28 would be operated, causing the horizontal slotted bar 25 to be slid endwise. Consequently the bowl 20, arm 19, and tool-holder would be carried or caused to oscillate upon the shaft 12, thereby reversing the position of the cutting-tools, so that when the traveling table and stone made a return journey the points of the cutting-tools would be in a proper position to operate upon the stone, and this happens each time the traveling table arrives at the end of its stroke. The table not only reverses for the return journey, but, as just explained, the cutting-tools are also reversed in such a position as to operate upon the stone as required, and as the vertical tool-holder is in gear with the horizontal tool-holder, it follows that the motion of the horizontal tool-holder also reverses the position of the tools placed in the vertical tool-holder. The arm 19, projecting from the tool-holder, is made hollow by boring or casting, and in it is placed a spiral spring, 33, (see section Fig. 8,) one end of which spring is connected to the sliding block carrying the friction-bowl 20, the spring being employed for the purpose of forcing the sliding block against the curved dish or casting 34 as the tool-holder is caused to rock or oscillate upon its shaft.

It will be apparent that when the cutting-tools have operated upon the stone the intervening spaces between the tools must also be operated upon, and for that purpose I propose to move the stone bodily so as to present the uncut portion of the stone to the action of the tools; but this does not apply to the vertical tool-holder. To carry out this part of my invention, which is shown in Figs. 9 and 10, the former of which is a section cut across the table, 4 represents the traveling bed, under which is fixed a rack, 38, in gear with a pinion-wheel, 35, fixed on shaft 36, at one end of which is hand-lever 37. Therefore, when the cutting tools have dressed one portion of the stone, I move the hand-lever 37 so as to oscillate the pinion-wheel 35 in such manner that the rack 38, together with the bed and stone, is moved laterally and presents the undressed portion of the stone under the cutting-tools, as will be easily understood.

I claim as my invention—

1. In a stone-dressing machine, a reciprocating table which carries the stone to be dressed, in combination with an oscillating tool-holder journaled crosswise of said table, a second oscillating tool-holder at right angles to the first holder and perpendicular to the plane of the surface of the table, both of said tool-holders remaining stationary and immovable while the cutting-tools fixed thereto are operating upon the stone, and gearing intermediate between said holders, substantially as set forth, whereby the oscillation of one effects also the oscillation of the other holder.

2. In a stone-dressing machine, a reciprocating table which carries the stone to be dressed, in combination with an oscillating tool-holder journaled crosswise of said table, a second oscillating tool-holder at right angles to the first holder and perpendicular to the plane of the surface of the table, both of said tool-holders remaining stationary and immovable while the cutting-tools fixed thereto are operating upon the stone, gearing intermediate between said holders, substantially as set forth, whereby the oscillation of one effects also the oscillation of the other holder, and means for automatically oscillating said tool-holders when the reciprocating table reaches its limit of travel in each direction.

3. In a stone-dressing machine, a reciprocating table which carries the stone to be dressed, and an oscillating tool-holder journaled crosswise of said table, in combination with the longitudinally-sliding bar 25, with which said holder is connected, the rock-shaft 22, levers connecting said shaft with said sliding bar, the lever-arm 30, carried by said shaft, and dogs or tappets 32 on said reciprocating table, which encounter said lever arm, substantially as set forth.

4. In a stone-dressing machine, the oscillating tool-holder and the longitudinally-sliding bar 25, having a perpendicular slot therein, in combination with the arm 19, connected with said holder, said arm having a projection, 20, which enters said slot, substantially as set forth.

5. In a stone-dressing machine, the oscillating tool-holder having arm 19, and a spring-actuated sliding block in said arm, in combination with the fixed curved track or dish 34, against which said block bears, substantially as set forth, whereby vibrations of the holder are prevented.

6. In a stone-dressing machine, a reciprocating table having a laterally-movable bed-plate upon which the stone is placed, a rock-shaft journaled in said table beneath said bed-plate, racks carried on the under side of said bed-plate, and pinions on said shaft, which engage said racks, in combination with a tool-holder mounted crosswise of and above said reciprocating table, and a series of cutting-tools carried by said holder, which act simultaneously upon the stone on said bed-plate.

In witness whereof I have hereunto signed my name in the presence of two subscribing witnesses.

JAMES COULTER.

Witnesses:
C. W. WHITMAN,
    *U. S. Consular Agent.*
A. B. CROSSLEY,
    *Market Place, Huddersfield.*